United States Patent
Hso (10) Patent No.: US 6,877,591 B1
(45) Date of Patent: Apr. 12, 2005

(54) CRANK OF A SHOCK ABSORBER FOR A BICYCLE

(76) Inventor: Yung-Feng Hso, 2F., No. 1, Alley 48, Lane 24, Sec. 2, Changrong Rd., Tainan (TW)

(*) Notice: Subject to any disclaimer, the term of this patent is extended or adjusted under 35 U.S.C. 154(b) by 0 days.

(21) Appl. No.: 10/713,021

(22) Filed: Nov. 17, 2003

(51) Int. Cl.$^7$ .................................................. F16F 9/00
(52) U.S. Cl. .................. 188/321.11; 267/118; 267/175; 280/284
(58) Field of Search ...................... 188/321.11; 267/118, 267/120, 113, 124, 175; 280/283, 284

(56) References Cited

U.S. PATENT DOCUMENTS

| | | | | |
|---|---|---|---|---|
| 5,409,248 A | * | 4/1995 | Williams | 280/284 |
| 5,474,318 A | * | 12/1995 | Castellano | 280/284 |
| 6,102,421 A | * | 8/2000 | Lawwill et al. | 280/284 |
| 6,755,432 B2 | * | 6/2004 | Muser | 280/283 |

* cited by examiner

Primary Examiner—Robert A. Siconolfi
Assistant Examiner—Melanie Torres
(74) Attorney, Agent, or Firm—Bacon & Thomas PLLC (57) ABSTRACT

A crank of a shock absorber for a bicycle has two ends respectively pivotally connected with a bicycle frame and a rear shock absorber, having a round hole and a disc fitted in the round hole, a rear bearing hole, a narrow groove communicating with the round hole and the rear bearing hole, a nut at one side of the groove and a bolt extending from outside through the groove to screw with the nut, the disc having an eccentric hole; a rear shock absorber has a pivot base to face the eccentric hole for a micro-adjusting rod to extend therein stably. Then the micro-adjusting rod is rotated for an angle to alter the angle of the shock absorber relative to the bicycle frame, so a user can adjust elastic force of the shock absorber according to the capability, the body weight and road conditions.

6 Claims, 8 Drawing Sheets

CRANK OF A SHOCK ABSORBER FOR A BICYCLE

BACKGROUND OF THE INVENTION

1. Field of the Invention

This invention relates to a crank of a shock-absorber for a bicycle, particularly to one adjustable in its shock-absorbing angle and its length applicable to a rear shock-absorber of different lengths so a user or racer can adjust shock-absorbing force of the rear shock-absorber of a bicycle according to the capability and the body weight of a user and road conditions.

2. Description of the Prior Art

A conventional crank of a rear shock-absorber for a bicycle has a structure shown in FIGS. 1 and 5 in the Taiwan patent application case of the publicized number of 417654 (please refer to the enclosed case), which has a rear fork and a rear shock absorber with its one end connected with the rear fork and with the other end fixed firmly on a connect plate of a bicycle frame so as to produce shock-absorbing function between the frame and the rear fork. But this kind of shock-absorbing structure has the following flaws.

1. The position distance for the rear shock absorber is definite, so rear shock absorbers of different lengths cannot take place of the present one, necessitating changing the bicycle frame to suit to the new rear shock absorber.

2. The angle of the rear shock absorber relative to the bicycle frame is also definite, making it impossible to adjust shock-sbsorbing force of the rear shock absorber to suit to any user or racer of different capabilities, body weights and road conditions, so the conventional crank of a shock absorber has a design void of comfortableness and practicability.

SUMMARY OF THE INVENTION

The objective of the invention is to offer a crank of a shock-absorber for a bicycle adjustable in its shock-absorbing angle and its length for assembling any shock-absorber with different sizes, so any user or racer can adjust the shock-absorbing force of the shock-absorber depending on the capability, the body weight and road conditions.

The feature of the invention is a crank having two ends respectively pivotally connected with a bicycle frame and a rear shock absorber, a round hole and a rear bearing hole, a narrow groove between the round hole and the rear bearing hole, a nut at an upper side of the groove and a bolt at a lower side of the groove to pass through the groove and screw with the nut. The bolt tightens or loosens the groove and then a disc with an eccentric hole fitted in the round hole and rotatable microscopically. The rear shock absorber has a rear end connected with a pivotal base with a center hole facing to the eccentric hole for a micro-adjusting rod to fit therein stably. Then the micro-adjusting rod can be rotated to an angle to alter synchronously the angle of the rear shock absorber relative to the bicycle frame.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
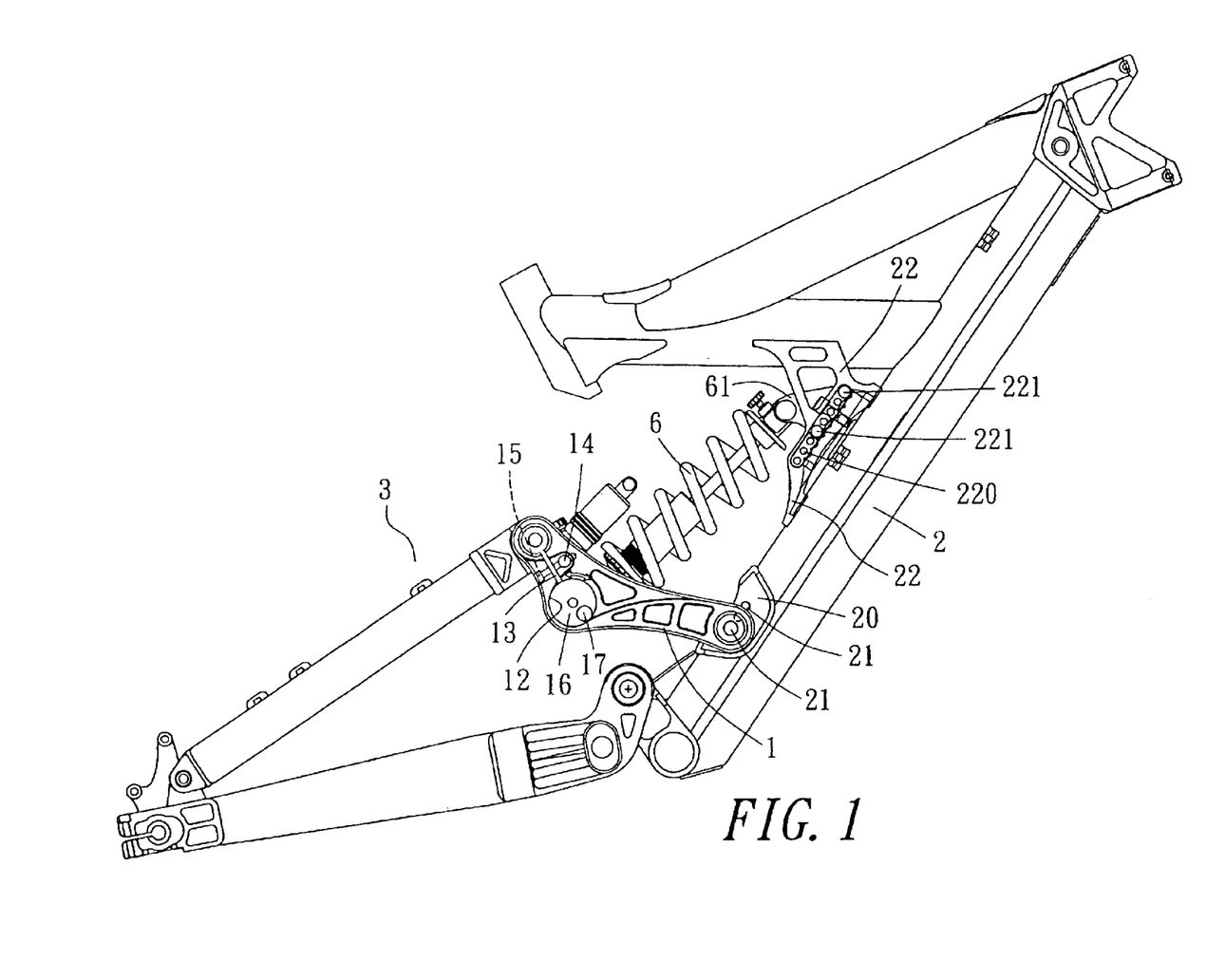
FIG. 1 is a partial side view of a bicycle frame using a crank of a shock absorber in the present invention.

A preferred embodiment of a crank of a shock-absorber for a bicycle in the present invention, as shown in FIG. 1, is positioned between a bicycle frame 2 and a rear fork 3, including two cranks 1, a rear connecting member unit 4, a front connecting member unit 5, and a rear shock-absorber 6 as main components.

The two cranks 1 respectively have one end formed with a rear bearing hole 10 aligned with and straddled one of two holes 30 formed in a tubular end of the rear fork 3. Then one set of the rear connecting members 4 pivotally connects the two cranks 1 with the tubular end of the rear fork 3.

Figure 2:
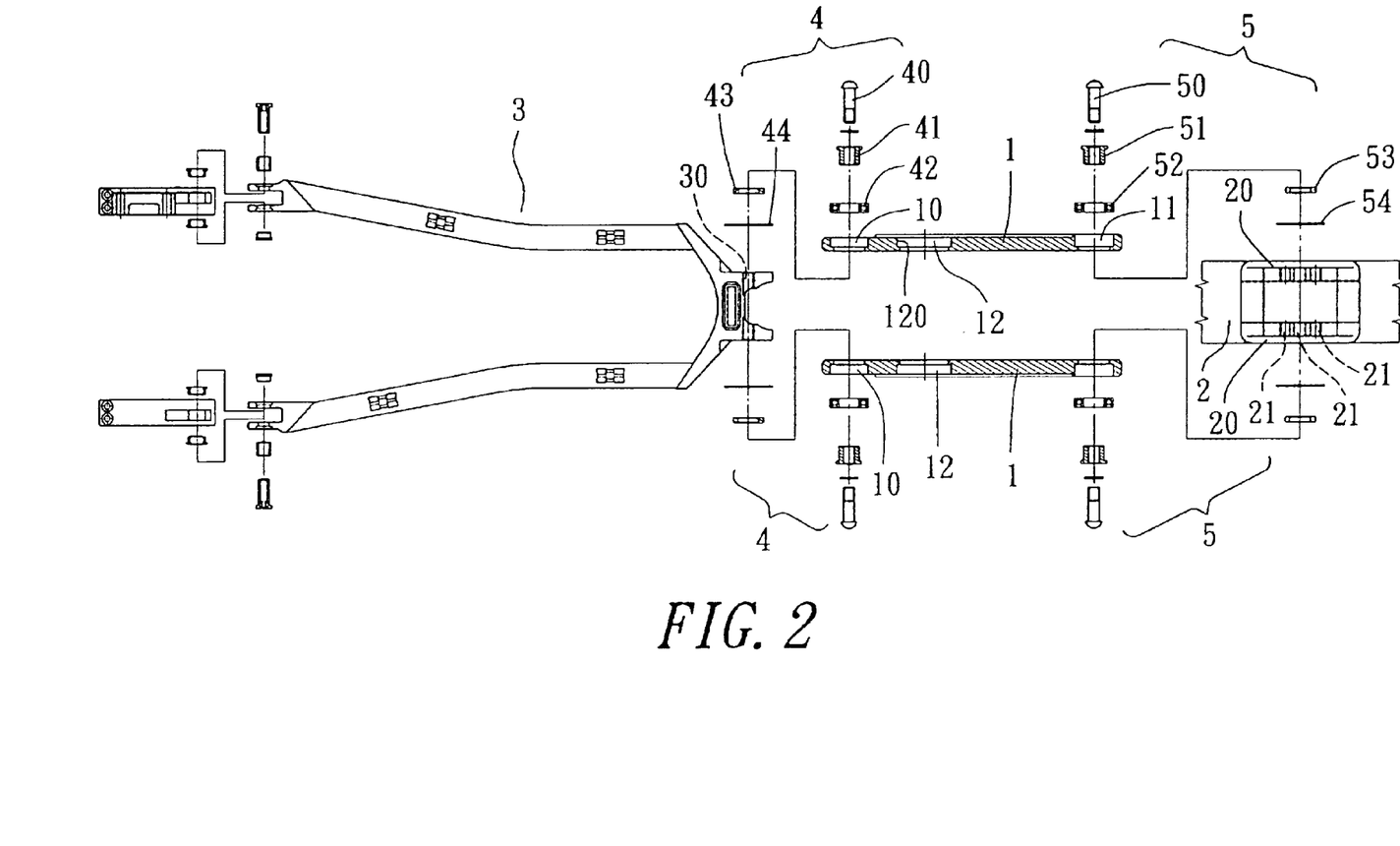
FIG. 2 is an exploded perspective view of a rear fork, a crank of a shock absorber and a bicycle frame in the present invention.

The rear connecting member unit 4 has a rear fixing pin 40, rear fixing bush 41, a rear bearing 42, a rear washer 43, and a rear dirt-preventing gasket 44. The rear bearing 42 is fitted in a rear bearing hole 10, as shown in FIG. 2, the rear fixing bush 41 is fitted in the center hole of the rear bearing 42. In assembling, the rear fixing pin 40 is inserted through the rear fixing bush 41, the rear bearing 42, the rear washer 43 and the rear dirt-preventing gasket 44 and then in the hole 30 of the rear fork 3 stably. Then the crank 1 can freely move by means of the rear bearing 42 relative to the rear fork 3.

The crank 1 has the other end bored with a front bearing hole 11 facing one side of the frame 2, and the frame 2 has a recessed surface 20 provided with many pivotal holes 21 formed on two sides for two connect member units 5 to pass through to connect the two cranks with the frame 2, as shown in FIG. 1. Thus, the two front connecting member units 5 connects the two cranks 1 with the frame 2.

The two front connecting member units 5 respectively have a front fixing pin 50, a front fixing bush 51, a front bearing 52, a front washer 53, a front dirt-preventing gasket 54. The front bearing 52 is fitted in a front bearing hole 11, and the front fixing bush 51 is fitted in the center hole of the front bearing 52. In assembling, the front fixing pin 50 is inserted through the front fixing bush 51, the front bearing 52, the front washer 53, the front dirt-preventing gasket 54 and then in the pivot hole 21 of the frame 2 stably. Then the front end of the two cranks 1 can be connected with any of the pivot holes 21 in the frame 2 so that the position of the crank 1 can be adjusted, with both the ends movable by means of the front and the rear connecting member units 4 and 5 pivotally connecting the cranks 1 with the frame 2 and the rear fork 3.

Further, the two cranks 1 respectively have a round hole 12 in front of the rear bearing hole 10, as shown in FIGS. 1 and 2, a narrow groove 13 communicating with both the round hole 12 and the rear bearing hole 10 as shown in FIG. 1, and a nut 14 such as a bar nut fixed at one side of the groove 13 and a bolt 15 screwing with the nut 14 at the other side of the groove 13.

Figure 3:
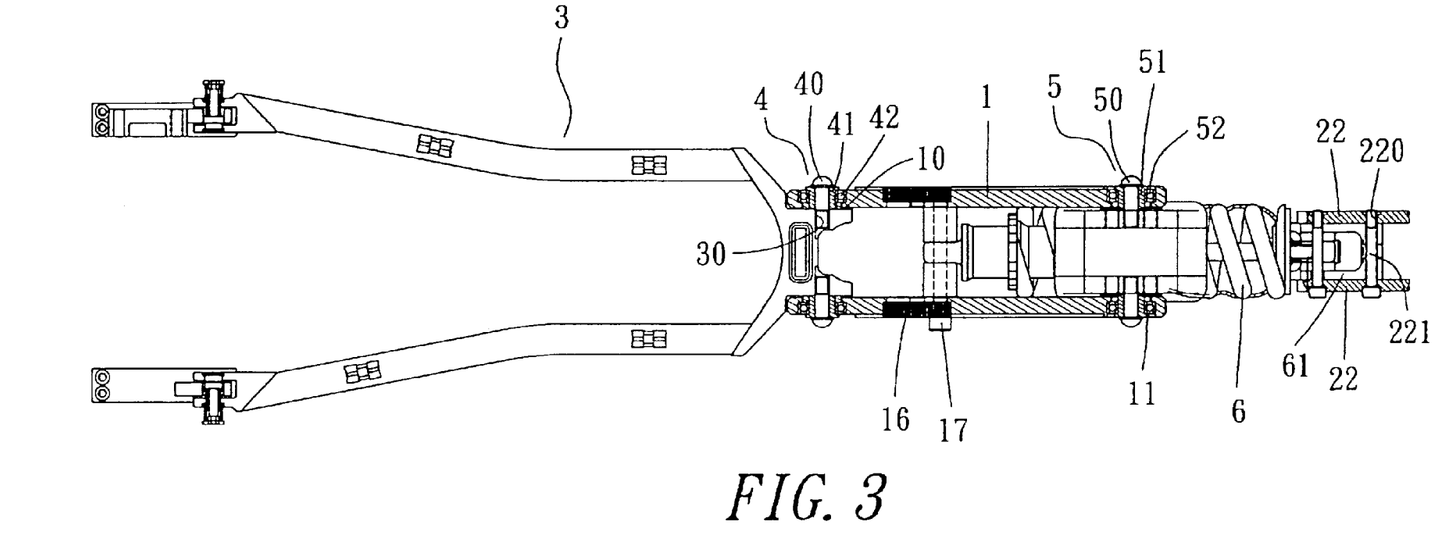
FIG. 3 is an upper combined view of FIG. 2.
Figure 4:
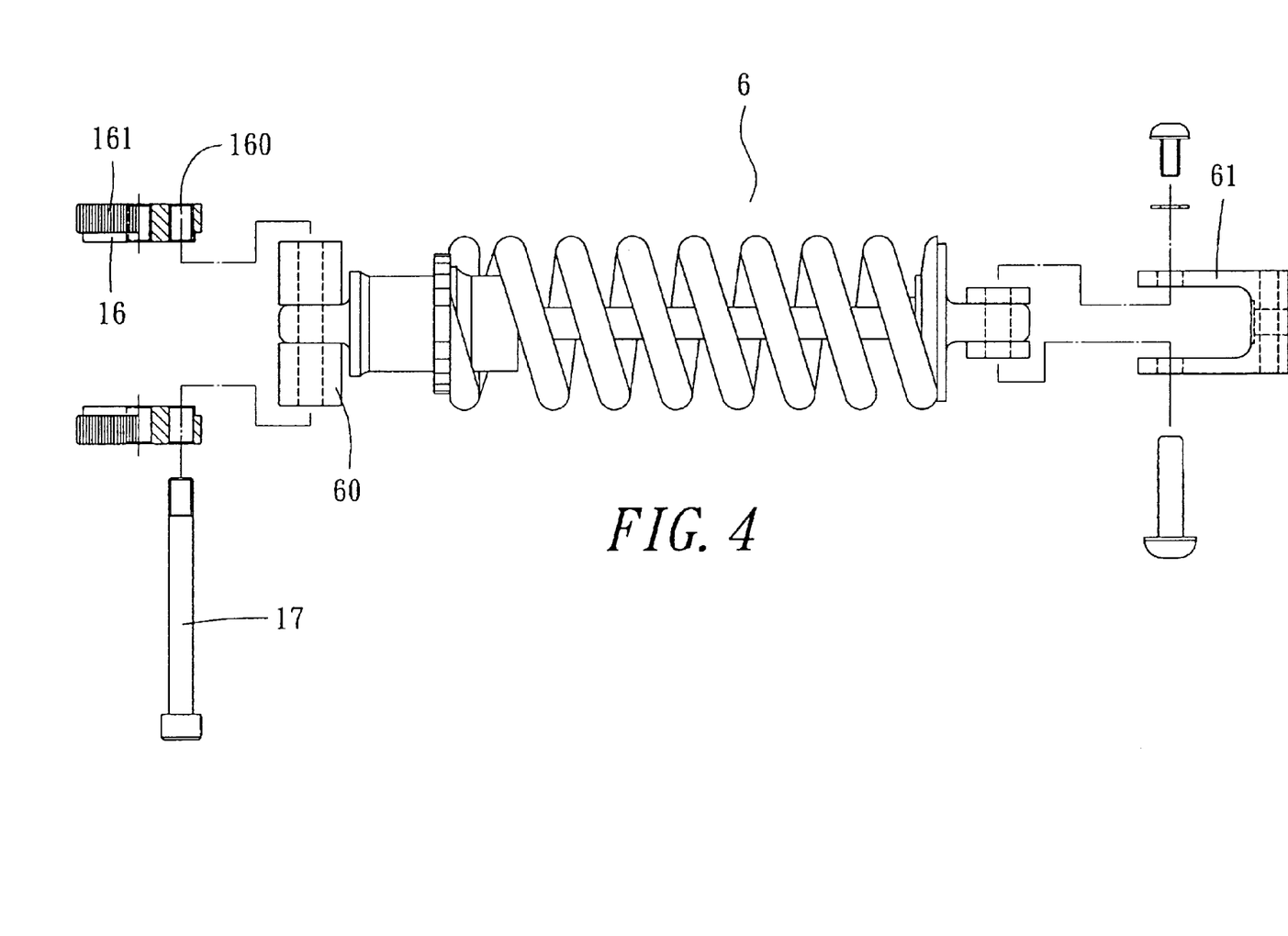
FIG. 4 is an exploded side view of the two ends of the shock absorber in the present invention.

Further, the cranks 1 respectively have the round hole 12 fitted therein with a disc 16 rotatable microscopically therein, as shown in FIGS. 3 and 4 and bored with an eccentric hole 160 and having its outer peripheral surface provided with a plurality of teeth 161 continuously and closely located vertically to engage with inner teeth 120 formed in an inner surface of the round hole 12.

The rear shock-absorber 4, as shown in FIG. 4, has a pivotal base 60 with a center hole positioned in the space between the two discs 16 in the round holes 12 of the two cranks 1 and facing the two eccentric holes 160, and a micro-adjusting rod 17 (like a hexagonal rod) extending through the two eccentric holes 160 and through the pivot base 60 and kept stably therein, as shown in FIGS. 1 and 3.

Therefore, the micro-adjusting rod 17 can be rotated for an angle to rotate also the two discs 16 in the same angle so that the angle of the shock absorber 6 may be altered synchronously according to the rotated angle, for adjusting shock-absorbing force. Then the bolt 15 is screwed tight, pressing tightly the groove 13 to control the round hole 12 communicating with the groove 13, so the discs 16 in the round holes 12 may be pressed tight to the adjusted position. On the contrary, in case the bolt 15 is loosened, The groove 13 is no longer pressed, freeing the discs 16, and then the micro-adjusting rod 17 can be again adjusted to alter the angle for changing the shock-absorbing force.

By the way, the rear shock-absorber 6 has its other end pivotally connected with the frame 2 by means of a U-shaped connecting member 61, as shown in FIGS. 1, 3 and 4, and the frame 2 has two parallel support members 22 at two sides of the connecting member 61, and each support member 22 is provided with plural holt holes 220 facing those holes 220 of the other support member 22 for bolts 221 to screw through to connect the rear shock absorber 6 with the bicycle frame 2 stably.

The crank of a shock absorber in the present invention has the following advantages in practical use.

Figure 5:
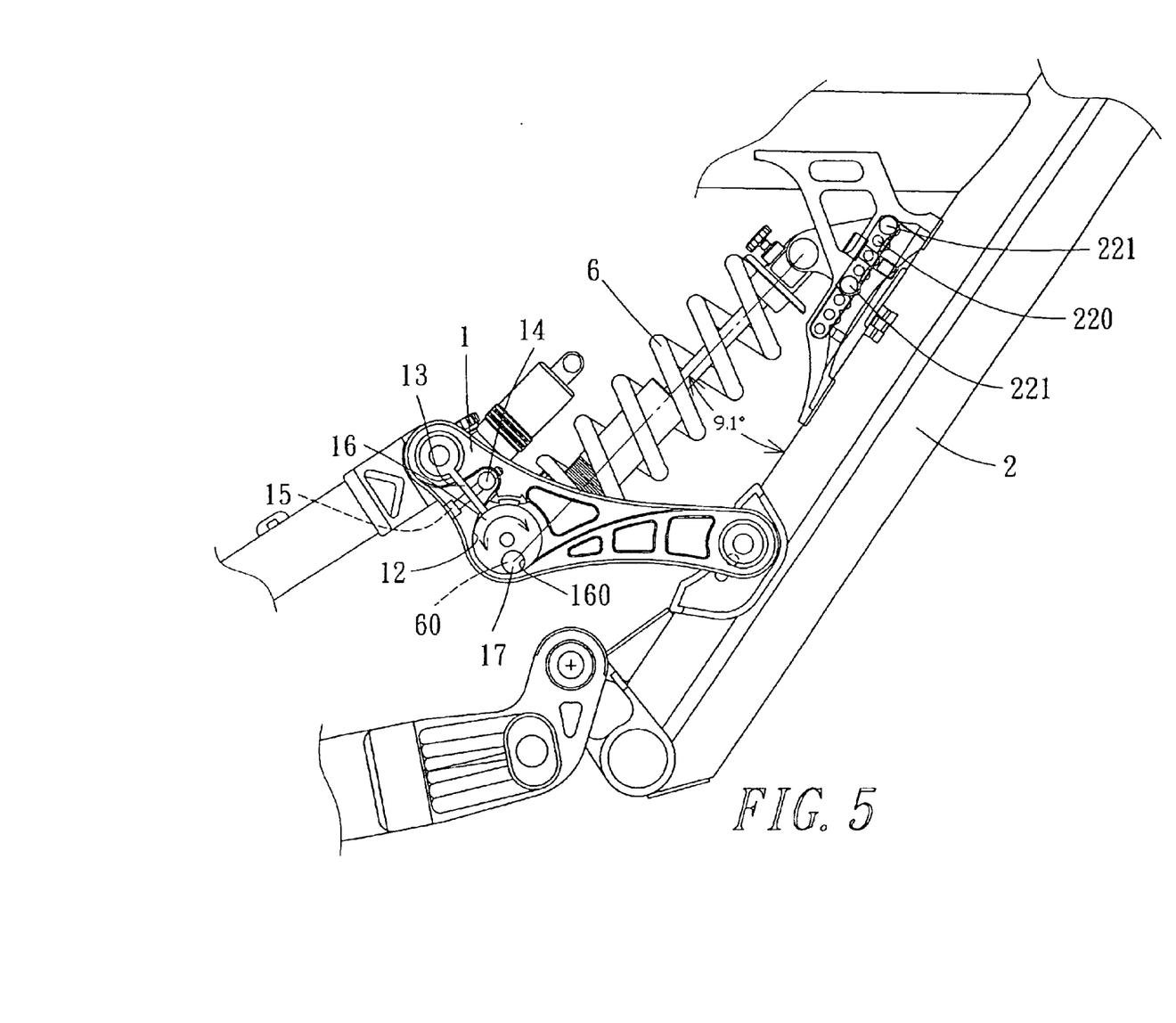
FIG. 5 is a side view of the partial bicycle frame with the crank of the shock absorber in the present invention.
Figure 6:
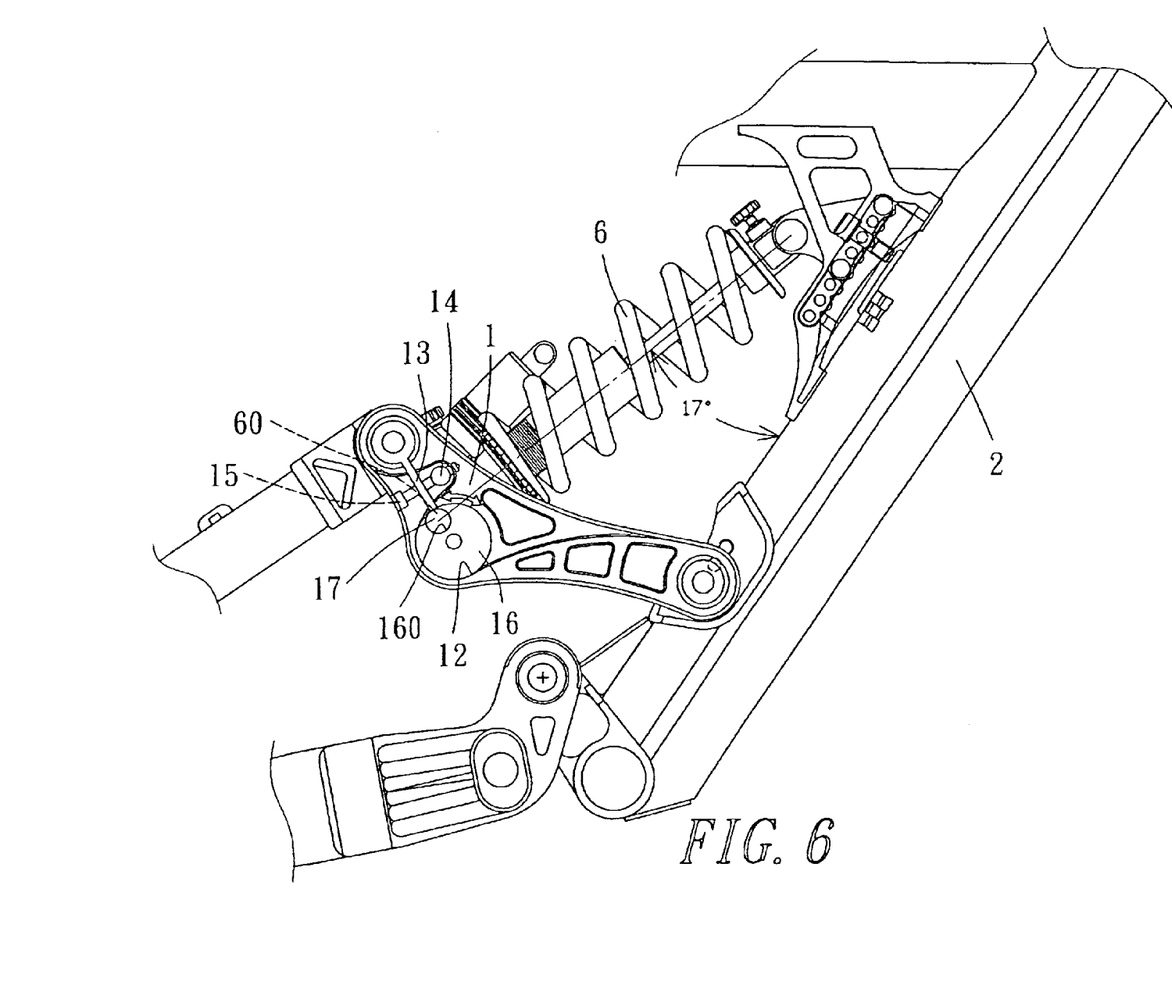
FIG. 6 is a side view of a micro-adjusting rod combined with the crank in the present invention.

1. The angle for shock absorbing is adjustable, referring to FIGS. 5 and 6, as the pivot base 60 is connected with the eccentric hole 160 of the disc 16 in the round hole 12 of the crank 1, and the micro-adjusting rod 17 passing through the eccentric holes 160, so the rear shock-absorber 6 can be altered in its angle relative to the bicycle frame 2 in case of the micro-adjustable rod 17 being rotated for a certain angle. For example, if the angle is adjusted to a large degree, as from that shown in FIG. 5 to that in FIG. 6, the sensibility of the rear shock-absorber 6 becomes rather low, and has more rigidity than before adjustment, in other words, its elasticity becomes less, suitable for running up a up-slope. On the contrary, if the angle is adjusted to a less degree, as from that in FIG. 6 to that in FIG. 5, the sensibility of the rear shock-absorber 6 becomes higher, in there words, its elasticity becomes larger, and then the rear shock-absorber 6 grows soft to suit to running down a down-slope. Therefore, a user or racer can adjust the crank of the rear shock absorber 6 in accordance with the capability, the body weight and road conditions.

Figure 7:
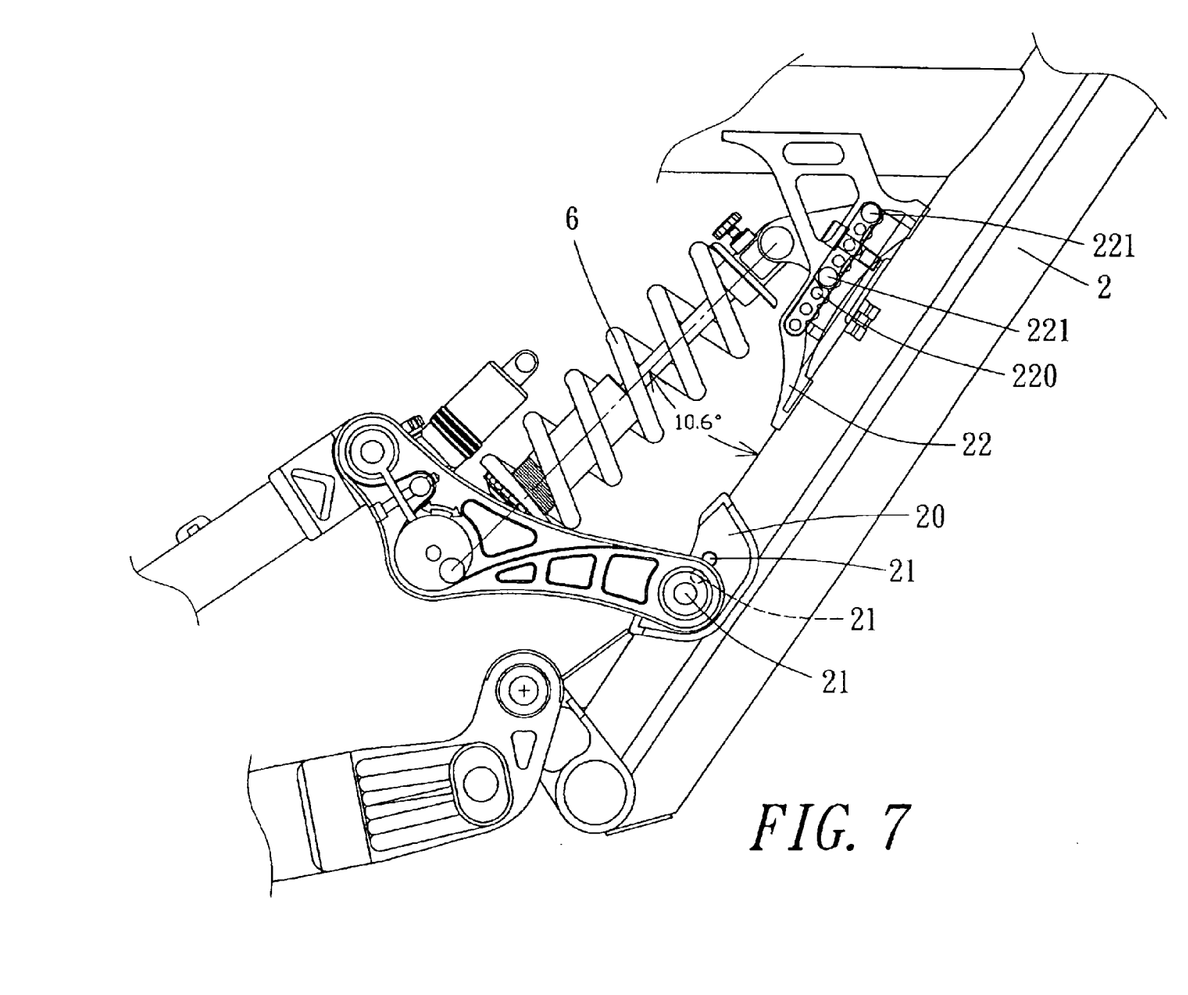
FIG. 7 is a side view of the crank of the rear shock-absorber connected with one of plural connect holes in the bicycle frame in the present invention; and, FIG. 8 is a side view of the plural connect holes in the bicycle frame for connecting the rear shock-absorber in different ways in the present invention.
Figure 8:
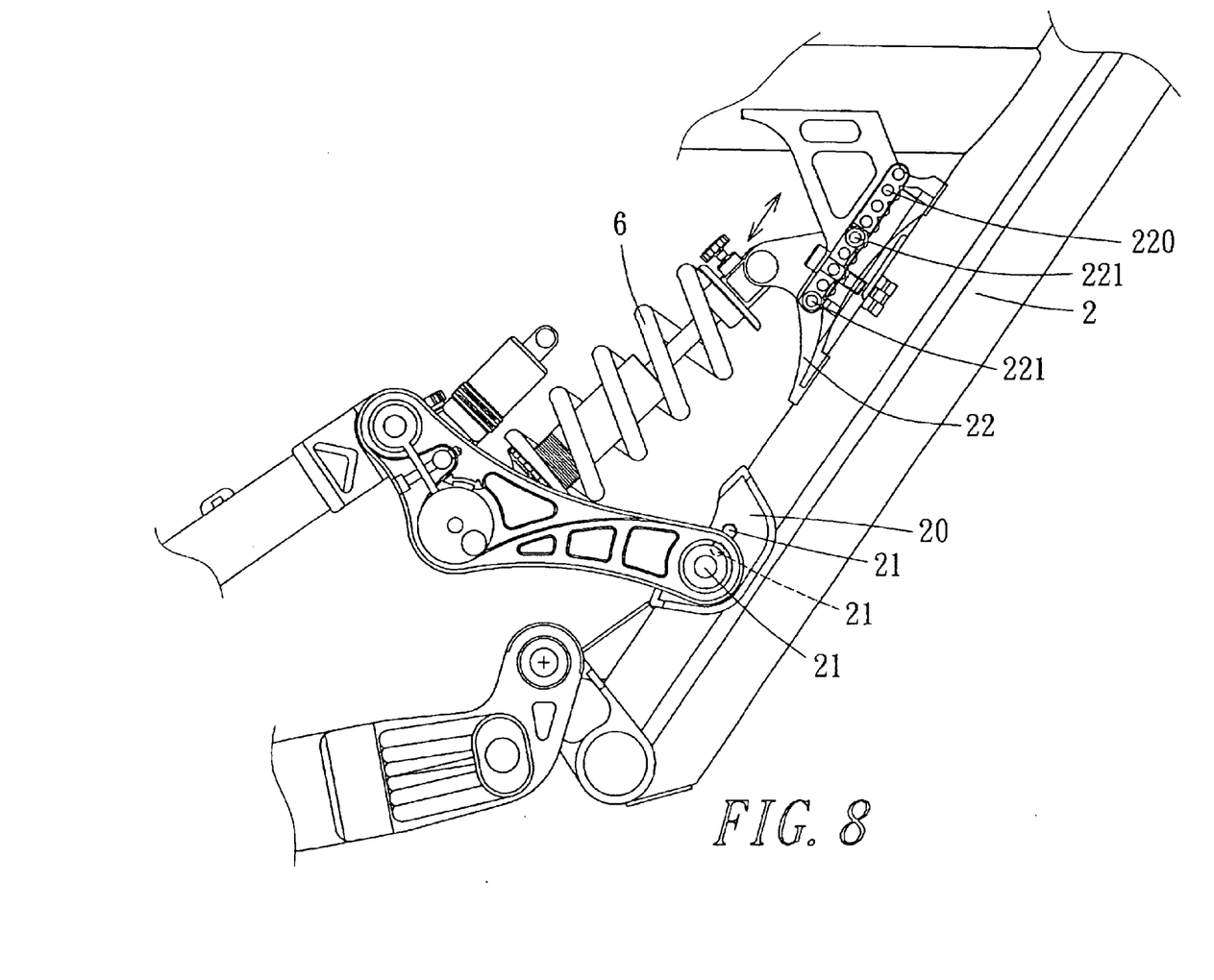

2. The shock-adjusting length is adjustable, referring to FIGS. 7 and 8, as rear shock absorbers 6 of different length can be used by optionally connecting it with one of the plural boltholes 220 in the supporters 22.

3. Adjustment of the shock-absorbing angle is convenient to carry out, referring to FIGS. 5 and 6. As described in the first advantage, loosening the bolt 15 and rotation of the micro-adjusting rod 17 can perform the adjustment, in case of the micro-adjusting rod being a hexagonal one, so a common hexagonal spanner is able to rotate the micro-adjusting rod 17 for rotating the discs 16, and then the bolt 15 presses the groove 13, and then the round hole 12, so the discs 16 is pressed to stabilize the adjusted position.

While the preferred embodiment of the invention has been described above, it will be recognized and understood that various modifications may be made therein and the appended claims are intended to cover all such modifications that may fall within the spirit and scope of the invention.

What is claimed is:

1. A crank of a shock absorber for a bicycle, said crank having a front end pivotally connected with a bicycle frame and a rear end pivotally connected with a rear fork, a rear bearing hole formed in the rear end portion, a round hole formed in an intermediate portion, a narrow groove formed between said round hole and said rear bearing hole, a nut positioned at an upper side of said groove, a bolt positioned at a lower side of said groove to screw with said nut from outside, a disc fitted in said round hole and provided with an eccentric hole, said disc possible to be rotated microscopically; a rear shock absorber having a rear end formed with a pivotal base with a center hole facing said eccentric hole of said disc, a micro-adjusting rod extending through said eccentric holes of two said discs and through said pivotal base firmly, said rear shock absorber having its front end pivotally connected with said bicycle frame; said micro-adjusting rod being rotated to alter synchronously the angle of said rear shock absorber relative to said bicycle frame.

2. The crank of a shock absorber for a bicycle as claimed in claim 1, wherein said rear shock absorber is pivotally connected with said bicycle frame by means of a connecting member, said bicycle frame has two parallel supporters fixed with two sides of said connecting member, said two parallel supporters respectively having a row of bolt holes facing each other, a bolt optionally passing through one pair of said bolt holes of said two supporters to pivotally connecting said rear shock absorber with said bicycle frame so as to alter the bolt's position for using a shock absorber of different specifications.

3. The crank of a shock absorber for a bicycle as claimed in claim 1, wherein two ends of said crank respectively are pivotally connected with said bicycle frame and a rear fork by means of two pairs of two connecting units, said connecting units respectively consisting of a fixing pin, a fixing bush, a bearing, a washer, and a dirt-preventing gasket, one of said bearing fitting in said rear bearing hole of said crank, one of said bush fitting in said bearing, one of said fixing pin orderly extending through said fixing bush, said bearing, said washer and said dirt-preventing gasket to fix one of said two connecting units with said crank.

4. The crank of a shock absorber for a bicycle as claimed in claim 1, wherein said narrow groove is provided in a wall between said rear bearing hole and said round hole of said crank.

5. The crank of a shock absorber for a bicycle as claimed in claim 1, said round hole of said crank has a plurality of vertical teeth formed continuously and closely in an inner wall, and said disc also has the same vertical teeth formed continuously and closely in its outer circumferential surface to engage with each other.

6. The crank of a shock absorber for a bicycle as claimed in claim 1, wherein said bicycle frame has its recessed connecting location formed with a plurality of bolt holes for said bolt to optionally fit through to secure the front end of said crank with said frame stably.

* * * * *